March 30, 1971 S. STRELZOFF ET AL 3,573,224
PRODUCTION OF HYDROGEN-RICH SYNTHESIS GAS
Filed Nov. 14, 1967 2 Sheets-Sheet 1

SAMUEL STRELZOFF
HERBERT C. MORGENSTERN
JOHN M. CONNOR
INVENTOR.

BY *J. T. Chabotey*
AGENT

SAMUEL STRELZOFF
HERBERT C. MORGENSTERN
JOHN M. CONNOR
INVENTOR.

United States Patent Office 3,573,224
Patented Mar. 30, 1971

3,573,224
PRODUCTION OF HYDROGEN-RICH SYNTHESIS GAS
Samuel Strelzoff and John M. Connor, New York, N.Y., and Herbert C. Morgenstern, Westwood, N.J., assignors to Chemical Construction Corporation, New York, N.Y.
Filed Nov. 14, 1967, Ser. No. 682,825
Int. Cl. C01b 2/02
U.S. Cl. 252—376    18 Claims

ABSTRACT OF THE DISCLOSURE

A gaseous hydrocarbon such as methane or vaporized naphtha is passed through a first fluid bed of hot solid particulate material at a temperature above 700° C., to crack a portion of the hydrocarbon stream into hydrogen and solid free carbon, with concomitant deposition of the free carbon which may coat the solid particles, and the formation of a gaseous mixture of hydrogen and residual gaseous hydrocarbon. Steam is added to the gaseous mixture, and the combined gaseous mixture is passed through a second fluid bed at a temperature above 850° C., to react residual gaseous hydrocarbon with steam and form further hydrogen and carbon monoxide. A product hydrogen-rich synthesis gas stream principally containing hydrogen, carbon monoxide and steam is removed from the second bed. A stream of hot solid particulate material is passed from the second bed to the first bed, to maintain a temperature level above 700° C. in the first bed; and a corresponding stream of solid particulate material containing deposited and entrained solid carbon is removed from the first bed and passed to a third bed in a stream of air, which may react with the carbon to produce temperature rise. In the third bed, the solid particulate material is reheated to a temperature above 1000° C., by combustion of a fluid hydrocarbon fuel and deposited or entrained solid carbon with air in the bed. A third stream of reheated solid particulate material is passed from the third bed to the second bed, to maintain the second bed at a temperature above 850° C. and compensate for the stream of material passed from the second bed to the first bed. The air stream used to pass solid particulate material from the first bed to the third bed reacts with deposited solid carbon to form a gaseous phase containing carbon monoxide and nitrogen. When the process is employed to produce ammonia synthesis gas, this gaseous phase is separated from the solid particles and combined with the main product hydrogen-rich synthesis gas, to form a combined gas stream suitable for conversion to ammonia synthesis gas.

BACKGROUND OF THE INVENTION

Field of the invention

Figure 1:
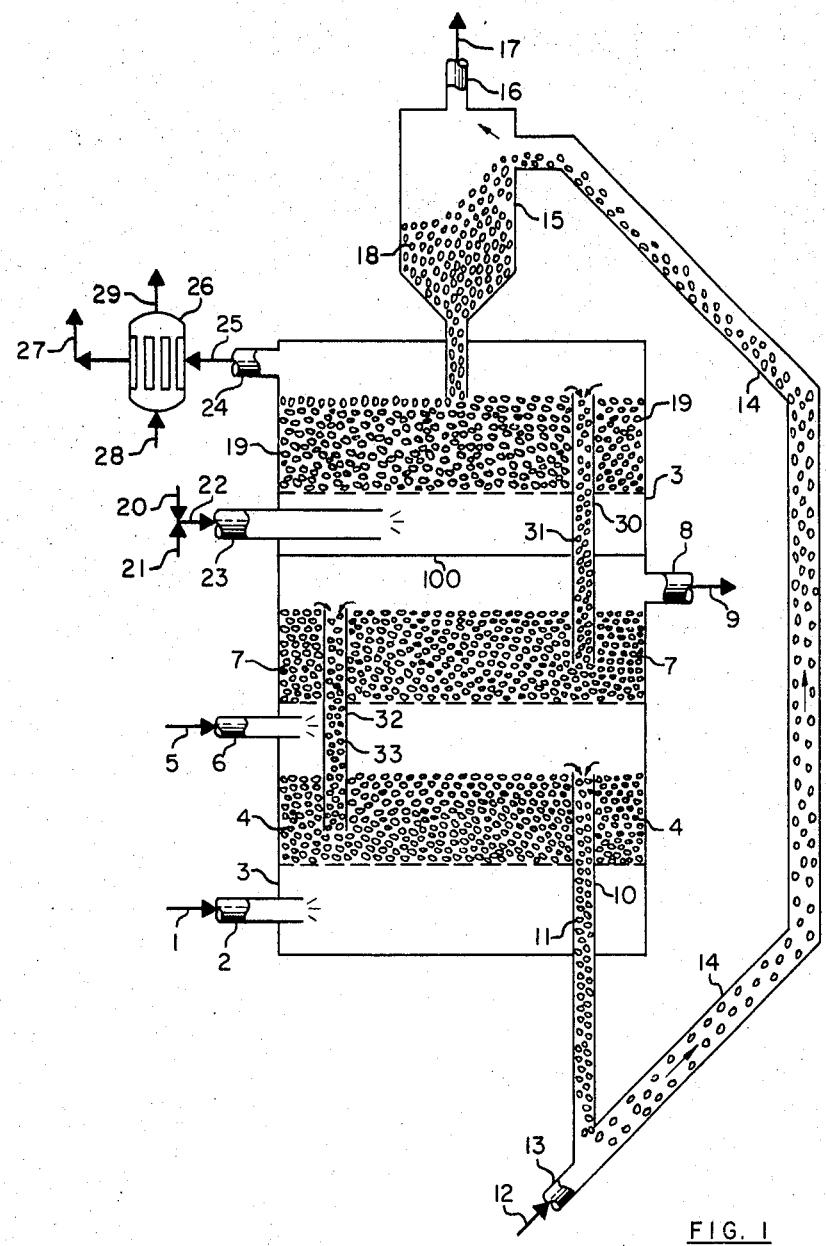

The invention relates to the production of a hydrogen-rich synthesis gas, such as ammonia synthesis gas, by the cracking of gaseous hydrocarbons and reaction of residual hydrocarbon with steam, in hot fluid beds of solid particulate material which may be inert or catalytic.

Description of the prior art

Fluidized solids processing such as the cracking of methane, followed by reforming of the resulting product and burning the carbon deposit off the catalyst or refractory particles to generate heat is generally described in such disclosures as U.S. Pats. Nos. 1,906,912; 2,116,993; 2,166,611; 2,393,636; 2,783,133; 2,829,113; 2,844,522; 3,129,060 and 3,264,066. Other patents showing pebbles or other solid particulate material in a plurality of beds for the fluidized solids processing of hydrocarbons include U.S. Pats. Nos. 2,546,606; 2,566,620; 2,526,652; Reissue No. 24,148; 2,607,668 and 2,607,669; 2,671,720; 2,671,721; 2,678,264; 2,765,222 and 3,168,386. Other patents of interest in this field of art include U.S. Pats. Nos. 2,071,721; 2,503,291 and 2,690,963, as well as British Pats. Nos. 350,413; 547,881; 711,671; 737,394; 822,615 and 1,039,394 and German Pat. No. 1,079,268.

SUMMARY OF THE INVENTION

The present invention relates to the processing of fluid hydrocarbons in the gaseous state to form a hydrogen-rich synthesis gas, by passing a stream of gaseous hydrocarbon upwards through two fluid beds in series. The two beds consist of heated solid particulate material, which may be inert or catalytic for the steam reforming reaction. A portion of the gaseous hydrocarbon is cracked in the lower bed, to form free hydrogen and solid carbon, so that the gas phase rising from the lower bed to the upper bed contains free hydrogen and unreacted hydrocarbon, and the solid free carbon is entrained and may deposit as a coating on the solid particles of the lower bed. Steam is injected into the rising gas phase between the beds, and the mixed gas phase then flows into the upper bed, which is at a higher temperature than the lower bed. A reaction between the steam and residual hydrocarbon takes place in the upper bed, with the formation of further free hydrogen and carbon monoxide. A hydrogen-rich synthesis gas principally containing free hydrogen, carbon monoxide and steam is discharged above the upper bed. A stream of solid particulate material flows from the hotter upper bed to the lower bed, preferably by gravity flow, to maintain a temperature level above 700° C. in the lower bed. A stream of cooler solid particulate material coated with and containing entrained solid carbon is removed from the lower bed, and is passed to a third fluid bed into which air and a fluid hydrocarbon fuel are also passed, so that an exothermic combustion reaction takes place in the third bed between the air stream and the combustible solid carbon coating and fuel. This reaction raises the temperature of the solid particulate material to a level of over 1000° C., and a stream of hot solid particles is passed from the third bed to the upper bed in which the steam-hydrocarbon reaction takes place, so as to maintain the upper bed at a temperature above 850° C. The hydrogen-rich synthesis gas discharged above the upper bed may be directly employed in such processes as methanol synthesis or the Fischer-Tropsch synthesis, however, in some instances the desired final product is a nitrogen-hydrogen gas mixture for ammonia synthesis. In this case, the stream of carbon-coated solid particulate material discharged from the lower bed is pneumatically conveyed to the third bed with a stream of air, and the air stream concomitantly reacts with a portion of the carbon coating or entrained solid carbon to form a gaseous phase principally containing carbon monoxide and nitrogen. This gaseous phase is separated from the solids stream, and is then combined with the hydrogen-rich synthesis gas discharged above the upper bed to form a crude synthesis gas principally containing hydrogen, nitrogen, carbon monoxide and steam, and suitable for conversion to ammonia synthesis gas. In most instances, the synthesis gas produced by the process of the present invention will also contain a minor proportion of carbon dioxide, as well as inerts such as argon and unconverted hydrocarbon such as methane.

The principal advantage of the present invention is that the reactor is relatively simple to construct and operate, compared to the costly and complex steam reformers of the prior art, which employ a plurality of catalyst-filled externally heated reformer tubes suspended in a reform furnace to accomplish the reaction between steam and a fluid hydrocarbon. In addition, the prior art tubular reformers are limited with respect to operating pressure, due to the possibility of metal tube failure under high pressure and at elevated temperature; while in the present invention the reactor may be operated at any desired pressure and is typically operated at a pressure above about 35 kg./sq.cm. and up to about 400 kg./sq.cm. Further, the prior art steam reforming processes usually require the utilization of expensive catalytic materials to accomplish the steam-hydrocarbon reaction, while in the present invention, the fluid beds may contain solid particles of less costly inert materials such as silica or alumina. Finally, the procedure of the present invention employs gravity flow and pneumatic conveying to transfer hot solids particles, and thus in most instances no valves or similar control devices are required for high temperature service.

It is an object of the present invention to provide an improved process for the production of a hydrogen-rich synthesis gas from hydrocarbons and steam.

Another object is to provide an improved process for producing synthesis gas in a fluid bed reactor.

A further object is to provide a high pressure process for the production of synthesis gas.

An additional object is to provide an improved process for reacting hydrocarbons with steam.

Still another object is to provide a fluid bed process for cracking hydrocarbons and reacting hydrocarbons with steam in successive fluid beds.

Still a further object is to provide an improved process for producing a synthesis gas stream suitable for conversion to ammonia synthesis gas.

These and other objects and advantages of the present invention will become evident from the description which follows.

DESCRIPTION OF THE DRAWINGS AND PREFERRED EMBODIMENTS

Figure 2:
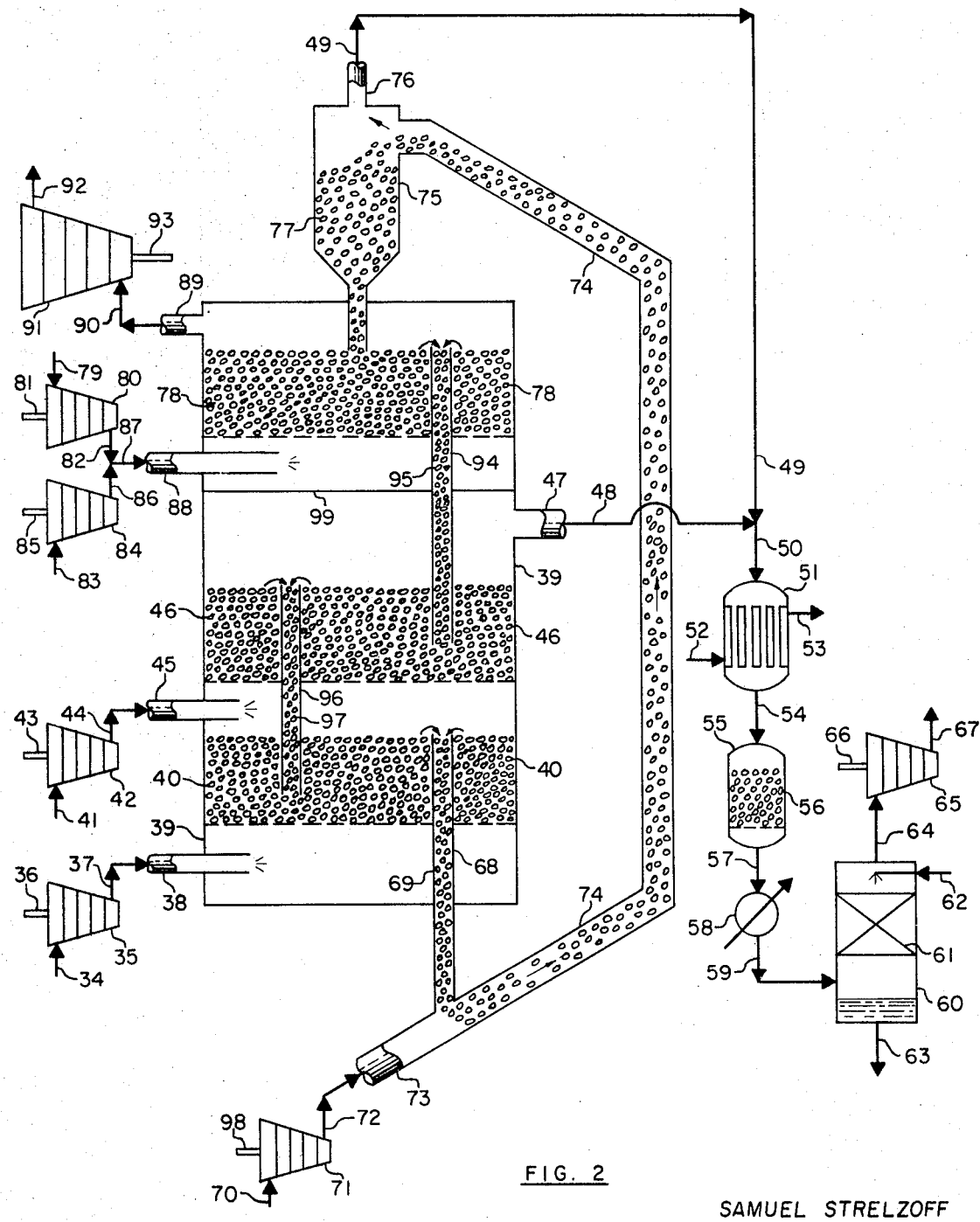

Referring now to the drawings, FIG. 1 is a flowsheet of a generalized operation of the process as applied to the production of a hydrogen-rich synthesis gas, and FIG. 2 is a flowsheet of a preferred embodiment of the invention as applied to the high pressure production of ammonia synthesis gas.

Referring now to FIG. 1, stream 1 consisting of a gaseous hydrocarbon such as methane or natural gas, or a vaporized normally liquid hydrocarbon such as naphtha, is passed via inlet conduit 2 into reaction vessel 3 below lower fluidized solids bed 4. The bed 4 consists of a suitable fluidized solid particulate material, which may be inert and non-catalytic, such as silica, alumina, magnesia or kaolin. In other instances, bed 4 may consist of solid particulate material which is catalytic for the steam reforming reaction, such as a catalytic agent consisting of a reduced nickel salt, nickel oxide, metallic nickel, a reduced cobalt compound, metallic cobalt, zirconia, chromia or molybdenum oxide, which is usually deposited on a suitable inert carrier such as one of the inert materials mentioned supra. Bed 4 is maintained at a temperature generally above 700° C. and preferably in the range of 750° C. to 900° C., and the rising gaseous hydrocarbon stream flowing upwards through bed 4 serves to maintain the bed in an ebullient fluidized state. In addition, due to the elevated temperature of bed 4, a portion of the hydrocarbon stream is thermally cracked in bed 4 to free hydrogen and solid free carbon. In most instances, a major portion of the hydrocarbon is cracked. The solid carbon deposits as discrete particles or as a coating on the solid particles of bed 4, while the free hydrogen together with unreacted gaseous hydrocarbon flows upwards from bed 4. Stream 5 consisting of high pressure or superheated steam is injected via conduit 6 into vessel 3 above bed 4, and mixes with the rising hydrogen-hydrocarbon gas phase. In most instances, the proportion of steam injected will be between 1 and 10 mols of steam per mol of unreacted hydrocarbon in the rising gas phase. The resulting gaseous mixture of steam, unreacted gaseous hydrocarbon and hydrogen now flows upwards within vessel 3 and into fluidized bed 7, which is comparable in composition and configuration to bed 4 described supra. Bed 7 is maintained at a higher temperature than bed 4, and is generally at a temperature above 850° C. and typically in the range of 950° C. to 1100° C. In addition, the bed 7 is fluidized by the rising gas mixture. The steam reforming reaction between steam and previously unreacted hydrocarbon takes place in bed 7, with the resultant reaction and elimination of most or substantially all of the hydrocarbon and the formation of carbon monoxide and further free hydrogen in the gaseous phase. In addition, a minor proportion of carbon dioxide may form in bed 7. The rising gaseous phase discharged upwards from bed 7 is diverted by partition 100, and flows out of vessel 3 via conduit 8 as stream 9, which is the product of the process and consists of a hydrogen-rich synthesis gas stream principally containing hydrogen, carbon monoxide and steam. A minor proportion of carbon dioxide may also be present in stream 9.

Returning now to the lower bed 4, solid particulate material coated with a layer of solid carbon and usually containing discrete particles of deposited solid carbon flows from bed 4 into the upper end of the vertically oriented solids removal conduit 10, and flows downwards in conduit 10 by gravity flow as solids stream 11. The solids particles 11 are discharged at the lower end of conduit 10, and are then pneumatically conveyed upwards by air stream 12 which is admitted via conduit 13. The conduit 13 extends to solids transfer conduit 14, in which the solids are pneumatically conveyed vertically upwards. Oxidation of a portion of the free carbon such as the coating on the solids particles by reaction with the oxygen content of air stream 12 also takes place in conduit 14, with the formation of a gaseous phase mainly consisting of carbon monoxide and nitrogen. The conduit 14 discharges the gas phase and entrained solids into solids-gas separator vessel 15 which is usually a baffled or cyclonic unit, and from which the separated gaseous phase is discharged via conduit 16 as stream 17, which principally contains carbon monoxide and nitrogen. As will appear infra, in instances when a crude gas stream suitable for conversion to a mixed hydrogen-nitrogen gas stream for ammonia synthesis is desired, stream 17 may be combined with stream 9 to form a combined gas stream, which is subsequently processed to remove carbon oxides and yield ammonia synthesis gas.

The separated solids collect in the lower part of vessel 15 as bed 18, from which the solids flow downwards out of vessel 15 and into the fluidized solids bed 19 in the upper section of vessel 3 for reheating. Combustion air stream 20 and fluid hydrocarbon fuel stream 21 are combined and pass via stream 22 into conduit 23, which may be a fuel burner of conventional design and is disposed between bed 19 and partition 100. Fuel stream 21 consists of a fluid hydrocarbon fuel such as methane, naphtha, fuel oil or residual oil, and the combustion of stream 21 below and within bed 19 serves to raise the temperature of the solids particles in bed 19 to a level above 1000° C. and typically in the range of 1100° C. to 1300° C. In addition, the rising flue gas derived from the combustion of stream 21 serves to fluidize bed 19. Stream 20 is provided in stoichiometric excess relative to stream 21, so that unreacted oxygen discharged from burner 23 rises through bed 19 and oxidizes residual solid carbon previously entrained in or deposited on the solid particulate material, this providing an additional heating effect. The resulting hot flue gas discharged upwards from bed 19 is removed from the top of vessel 3 via conduit 24 as stream 25, which passes into the shell of steam boiler 26. Cooled flue gas is discharged from boiler 26 via stream 27, and may be passed to other heat exchange such as in an economizer, not shown, prior to discharge to the atmosphere. Condensate water or boiler feed water is passed into unit 26 via stream 28, and generated steam is removed via stream 29.

The reheated solid particles flow from fluidized solids bed 19 into the upper end of the vertically oriented conduit 30, which extends downwards from bed 19 and through partition 100 to bed 7. The solids particles flow downwards through conduit 30 and into bed 7 as stream 31, which serves to heat the bed 7 and maintain the desired elevated temperature in bed 7 as specified supra, which is required in order to accomplish the endothermic steam reforming reaction. In addition, hot solid particles flow from fluidized solids bed 7 into the upper end of the vertically oriented conduit 32, which extends downwards from bed 7 to bed 4. The solids particles flow downwards through conduit 32 and into bed 4 as stream 33, which serves to heat the bed 4 and maintain the desired elevated temperature in bed 4 as specified supra, which is required in order to accomplish the cracking of a portion of stream 1.

Referring now to FIG. 2, a preferred embodiment of the invention is illustrated, for the production of a high pressure gas stream for ammonia synthesis. The arrangement of fluidized solids beds in the FIG. 2 flowsheet is similar to the arrangement of FIG. 1, and consequently this portion of FIG. 2 will be described in a summary manner, with specific details being evident from the description of FIG. 1 supra. Since the procedure of FIG. 2 is carried out at elevated pressure, typically above about 35 kg./sq. cm. and up to about 400 kg./sq. cm., it will be understood that, in practice, the various process streams may be available at reduced pressure levels necessitating compression prior to reaction, however in many instances some of the streams such as process steam may be available at elevated pressure and may be directly passed to the process.

Stream 34, consisting of a gaseous hydrocarbon which is usually similar to stream 1 described supra, is passed into centrifugal compressor 35, which is driven by shaft 36. Unit 35 serves to compress stream 34 to an elevated pressure typically above about 35 kg./sq. cm., and the resulting compressed gaseous hydrocarbon stream 37 is passed via inlet conduit 38 into multi-bed reaction vessel 39 below the lower fluidized solids bed 40, which is at a temperature above about 700° C. The gaseous hydrocarbon rises through bed 40, and a portion of the gaseous hydrocarbon is cracked in bed 40, with concomitant formation of free hydrogen and free solid carbon which may deposit as a coating on the particles of bed 40. A gas phase consisting of free hydrogen and unreacted hydrocarbon rises from bed 40. A stream 41 consisting of process steam is compressed in compressor 42, which is driven by shaft 43. The resulting high pressure steam stream 44, now at a pressure typically above about 35 kg./sq. cm., is passed via conduit 45 into vessel 39 above bed 40, and mixes with the rising gas phase from bed 40. The combined gas mixture next flows upwards into fluidized solids bed 46, in which the steam reforming reaction takes place between steam and hydrocarbon at a temperature above about 850° C. The rising gas phase discharged upwards from bed 46 is a hydrogen-rich gas principally containing hydrogen, carbon monoxide, steam and a small proportion of carbon dioxide, and is diverted by partition 99 into conduit 47 and discharged from vessel 39 above bed 46 as stream 48.

The hydrogen-rich gas stream 48 is now combined with stream 49, which is derived from the process in a manner to be described infra and principally contains carbon monoxide and nitrogen. A small proportion of carbon dioxide may also be present in stream 49. The resulting combined gas stream 50 now principally contains hydrogen, nitrogen, carbon monoxide and steam, and is a crude synthesis gas suitable for conversion to ammonia synthesis gas. Stream 50 is passed into waste heat steam boiler 51, and flows through unit 51 in heat exchange with condensate or boiler feed water stream 52 which is passed into the shell of unit 51 external to the tubes. Stream 52 is vaporized in unit 51 and generated steam is removed via stream 53. The cooled process gas stream 54 discharged from unit 51 now passes to the catalytic water gas shift sequence, in which carbon monoxide in the gas stream is reacted with steam to produce further hydrogen and carbon dioxide. Additional steam, not shown, may be added to stream 54, and the process stream passes into the catalytic water gas shift reactor 55 which is provided with catalyst bed 56 consisting of iron oxide promoted with chromium oxide, or other suitable shift reaction catalyst. In some instances, unit 55 may be a multi-bed reactor provided with interbed cooling, to moderate the exothermic shift reaction. The resulting hot process gas stream 57 discharged from unit 55 now principally contains hydrogen, nitrogen, carbon dioxide and residual steam, and is cooled in heat exchanger 58. The cooled process gas stream 59 is now processed to remove carbon dioxide, typically by scrubbing with a selective liquid absorbent solution. Stream 59 is passed into scrubbing tower 60 below gas-liquid contact section 61, which may consist of spherical or ring packing, sieve trays or bubble cap plates, or other suitable contact means. A liquid absorbent solution 62, consisting of aqueous potassium or sodium carbonate solution, or an aqueous solution of an ethanolamine such as monoethanolamine or triethanolamine, is passed into unit 60 above section 61. The downflowing liquid solution selectively absorbs carbon dioxide in section 61, and the spent liquid solution stream 63 is withdrawn from the bottom of unit 60 and passed to regeneration, typically by heating at reduced pressure. The process gas stream 64 withdrawn from the top of unit 60 now consists principally of hydrogen and nitrogen in the requisite 3:1 molar ratio for ammonia synthesis. Stream 64 is usually further processed by means not shown, to remove traces of carbon oxides and water vapor. The stream 64 is then compressed in centrifugal compressor unit 65 to ammonia synthesis pressure, generally in the range of 210 kg./sq. cm. to 420 kg./sq. cm. The compressor unit 65 is driven by shaft 66, and discharges the compressed hydrogen-nitrogen process gas stream 67 for passage to ammonia synthesis.

Returning to bed 40 in unit 39, a portion of the carbon-coated solid particulate material of bed 40 flows into the upper end of vertical conduit 68, and flows downwards as stream 69. Air stream 70 is compressed in unit 71, which is driven by shaft 98, and the resulting compressed air stream 72 flows via conduit 73 into solids transfer conduit 74 and serves to pneumatically transfer the solids stream 69 vertically upwards to the upper solids-gas separation vessel 75. Oxidation of a portion of the carbon coating on the solids particles takes place within conduit 74, and the gas phase separated out in unit 75 consequently principally contains carbon monoxide and nitrogen. This gas phase is removed from unit 75 via upper conduit 76 and passed to further processng as stream 49, described supra.

The solids bed 77 settled out in unit 75 now flows downwards from the lower end of vessel 75 and into fluidized solids bed 78, in which the solid particulate material is reheated to a temperature above about 1000° C. and the solid carbon coating on the particles is burned off. Air stream 79 is compressed in compressor 80 driven by shaft 81, with compressed air being discharged via stream 82 at a pressure generally above about 35 kg./sq. cm. Fluid hydrocarbon fuel stream 83 is compressed in compressor or pump 84 driven by shaft 85, with compressed or pressurized fuel being discharged via stream 86 at a pressure generally above about 35 kg./sq. cm. Streams 82 and 86 are combined, and the resulting combined stream 87 is passed into feed conduit or burner 88. Combustion of stream 86 takes place within unit 39 above partition 99 and below and within bed 78, so as to elevate the temperature of the particulate solids in bed 78 to a level above 1000° C., and typically in the range of 1100° C. to 1300° C. In addition, stream 82 is provided in stoichiometric excess relative to stream 86, and the excess air serves to burn solid carbon off the solid particles in bed 78, thus aiding in temperature elevation. The resultant hot flue gas discharged upwards from bed 78 now flows out of unit 39 via conduit 89 as stream 90, which is at elevated temperature and pressure and is utilized for power recovery. Stream 90 is expanded through mechanical power recovery means such as gas turbine 91, with the resultant generation of useful power, and the expanded flue gas stream 92 may be directly discharged to atmosphere or initially passed through heat recovery means such as unit 26 described supra prior to discharge to atmosphere. The power generated by unit 91 is transmitted by shaft 93 to a power consumer, such as an electrical generator or a compressor. The shaft 93 may be connected with any or several of the shafts 36, 43, 66, 98, 81 and 85, and thus serve to drive the respective compressors or pumps.

The hot solid particulate material in bed 78 flows into the upper end of the vertical transfer conduit 94, and flows downward as stream 95 through partition 99 and into bed 46, thus serving to maintain the temperature of bed 46 above 850° C. Similarly, hot particles in bed 46 flow into the upper end of the vertical transfer conduit 96, and flow downwards as stream 97 into bed 40, thus serving to maintain the temperature of bed 40 above 700° C.

Numerous alternatives within the scope of the present invention will occur to those skilled in the art, besides those alternatives mentioned supra. The ranges of process variables such as temperature and pressure enumerated supra constitute preferred ranges for optimum utilization of the process concepts of the present invention, and the invention may be practiced outside of these ranges in suitable instances, except that the hydrocarbon cracking bed 4 or 40 will generally be maintained at a temperature above 700° C. in practice, to produce the cracking reaction, and the hydrocarbon reforming bed 7 or 46 will generally be maintained at a temperature above 850° C. in practice, to produce a substantially complete steam reforming reaction. The fluidized solids beds may be contained in separate reaction vessels in some instances, with transfer of the gaseous phase taking place by means of conduits. As mentioned supra, in instances when the hydrogen-rich synthesis gas stream is desired for purposes other than ammonia synthesis, stream 17 will be discharged to atmosphere or utilized as a fuel. A portion or all of stream 2 may be recycled to the process as stream 5, and a portion or all of stream 53 may be recycled to the process at stream 41.

An example of an industrial application of the process of the present invention will now be described.

EXAMPLE

The process was applied to the production of crude hydrogen-rich synthesis gas for ammonia synthesis, and the following data is based on 100 mols of methane feed to the cracking bed 40.

The gas phase rising from bed 40 had a composition of 15 mols methane and 170 mols hydrogen. The process was operated at a pressure of 35 kg./sq. cm.

We claim:
1. A process for the production of a hydrogen-rich synthesis gas stream which comprises
   (a) passing a gaseous stream comprising a normally fluid hydrocarbon upwards through a first fluid bed, said first bed comprising solid particulate material which is fluidized by the upwards flow of said gaseous hydrocarbon stream, said first bed being at a temperature in the range of 700° C. to 900° C. whereby a major portion of said hydrocarbon is thermally cracked to free hydrogen gas and solid carbon in said first bed, said solid carbon being at least partially deposited on the particulate material of said first fluid bed,
   (b) adding steam to the gaseous mixture of hydrogen and residual gaseous hydrocarbon discharged upwards from said first fluid bed,
   (c) passing the gaseous process stream produced by step (b) upwards through a second fluid bed, said second bed comprising solid particulate material which is fluidized by the upwards flow of said gaseous process stream, said second bed being at a temperature in the range of 850° to 1100° C. whereby substantially all of said residual gaseous hydrocarbon in said gaseous process stream is reacted with steam to form further hydrogen and carbon monoxide,
   (d) removing a product hydrogen-rich synthesis gas stream principally containing hydrogen, carbon monoxide and steam from above said second bed,
   (e) passing a first stream of solid particulate material from said second bed to said first bed, whereby said first bed is maintained at a temperature in the range of 700° C. to 900° C.,
   (f) removing a second stream of solid particulate material containing deposited solid carbon from said first bed,
   (g) passing said second stream of solid particulate material removed according to step (f) to a third fluid bed comprising solid particulate material,
   (h) reacting said second stream of solid particulate material derived from step (f) with air and a fluid hydrocarbon fuel in said third fluid bed, said air and fuel being passed upwards through said third fluid bed whereby said bed is fluidized, and whereby said fuel and solid carbon deposited on said solid particulate material are oxidized by said air and a temperature in the range of 1000° C. to 1300° C. is maintained in said third fluid bed,
   (i) passing a third stream of solid particulate material from said third bed to said second bed, whereby said second bed is maintained at a temperature in the range of 850° C. to 1100° C., and
   (j) removing a hot flue gas stream from above said third bed.
2. The process of claim 1, in which said gaseous stream comprising a normally fluid hydrocarbon of step (a) is

| | | Composition per 100 mols methane feed | | | | | | |
|---|---|---|---|---|---|---|---|---|
| Stream or Bed No. | Temp.,° C. | Methane | Hydrogen | Steam | Carbon monoxide | Carbon dioxide | Air | Nitrogen |
| 37 | 500 | 100 | | | | | | |
| 40 | 810 | | | | | | | |
| 44 | 480 | | | 80 | | | | |
| 46 | 1,040 | | | | | | | |
| 48 | 1,040 | 2 | 211 | 65 | 11 | 2 | | |
| 49 | 900 | | | | 49 | | | 91 |
| 50 | | 2 | 211 | 65 | 60 | 2 | | 91 |
| 70 | Ambient | | | | | | 118 | |
| 77 | 900 | | | | | | | |
| 78 | 1,200 | | | | | | | | selected from the group consisting of methane and vaporized naphtha.

3. The process of claim 1, in which said solid particulate material in said beds comprises non-catalytic inert material selected from the group consisting of silica, alumina, magnesia and kaolin.

4. The process of claim 1, in which said solid particulate material in said beds comprises a catalytic agent which is a catalyst for the steam reforming reaction, deposited on a suitable carrier.

5. The process of claim 4, in which said catalytic agent is selected from the group consisting of a reduced nickel salt, nickel oxide, metallic nickel, a reduced cobalt compound, metallic cobalt, zirconia, chromia and molybdenum oxide.

6. The process of claim 1, in which said fuel burned in step (h) is a fluid hydrocarbon selected from the group consisting of methane, naphtha, fuel oil and residual oil.

7. The process of claim 1, in which said second bed is vertically above said first bed, said first stream of solid particulate material passed from said second bed to said first bed according to step (e) is transferred downwards by gravity flow, said third bed is vertically above said second bed, said third stream of solid particulate material passed from said third bed to said second bed according to step (i) is transferred downwards by gravity flow, said second stream of solid particulate material removed from said first bed is passed downwards below said first bed by gravity flow and is then pneumatically conveyed vertically upwards and above said third bed by a stream of air, said air stream reacting with said second particulate material stream to burn a portion of the deposited carbon to carbon monoxide, and the resulting gaseous phase principally containing carbon monoxide and nitrogen is separated from said second particulate material stream prior to step (g).

8. The process of claim 7, in which said gaseous phase principally containing carbon monoxide and nitrogen is combined with said product hydrogen-rich synthesis gas stream of step (d), to form a process gas stream principally containing carbon monoxide, steam, hydrogen and nitrogen, and suitable for conversion to ammonia synthesis gas.

9. The process of claim 1, in which an elevated fluid pressure above about 35 kg./sq. cm. is maintained in said beds, and said flue gas removed according to step (j) is expanded through mechanical power recovery means before discharge to atmosphere.

10. A process for the production of a crude synthesis gas stream suitable for conversion to a hydrogen-nitrogen gas mixture for ammonia synthesis which comprises (a) passing a gaseous stream comprising a normally fluid hydrocarbon upwards through a first fluid bed, said first bed comprising solid particulate material which is fluidized by the upwards flow of said gaseous hydrocarbon stream, said first bed being at a temperature in the range of 700° C. to 900° C. whereby a major portion of said hydrocarbon is thermally cracked to free hydrogen gas and solid carbon in said first bed, said solid carbon being at least partially deposited on the particulate material of said first fluid bed, (b) adding steam to the gaseous mixture of hydrogen and residual gaseous hydrocarbon discharged upwards from said first fluid bed, (c) passing the gaseous process stream produced by step (b) upwards through a second fluid bed, said second bed comprising solid particulate material which is fluidized by the upwards flow of said gaseous process stream, said second bed being at a temperature in the range of 850° C. to 1100° C. whereby substantially all of said residual gaseous hydrocarbon in said gaseous process stream is reacted with steam to form further hydrogen and carbon monoxide, (d) removing a gas stream principally containing hydrogen, carbon monoxide and steam from above said second bed, (e) passing a first stream of solid particulate material from said second bed to said first bed, whereby said first bed is maintained at a temperature in the range of 700° C. to 900° C., (f) removing a second stream of solid particulate material containing deposited solid carbon from said first bed, (g) pneumatically conveying said second stream of solid particulate material, removed according to step (f), vertically upwards by a stream of air and above a third fluid bed comprising solid particulate material, said air stream reacting with said second particulate material stream to burn a portion of the deposited carbon to carbon monoxide, (h) separating the resulting gaseous phase principally containing carbon monoxide and nitrogen, and produced by step (g), from said second particulate material stream above said third fluid bed, (i) combining said gas stream removed according to step (d) with said resulting gaseous phase separated according to step (h), to form a crude synthesis gas stream principally containing hydrogen, carbon monoxide, steam and nitrogen, said crude synthesis gas stream being suitable for conversion to a hydrogen-nitrogen gas mixture for ammonia synthesis, (j) passing said second particulate material stream separated by step (h) into said third fluid bed, (k) reacting said second stream of solid particulate material with air and a fluid hydrocarbon fuel in said third fluid bed, said air and fuel being passed upwards through said third fluid bed whereby said bed is fluidized, and whereby said fuel and solid carbon deposited on said solid particulate material are oxidized by said air and a temperature in the range of 1000° C. to 1300° C., is maintained in said third fluid bed, (l) passing a third stream of solid particulate material from said third bed to said second bed, whereby said second bed is maintained at a temperature in the range of 850° C. to 1100° C., and (m) removing a hot flue gas stream from above said third bed.

11. The process of claim 10, in which said gaseous stream comprising a normally fluid hydrocarbon of step (a) is selected from the group consisting of methane and vaporized naphtha.

12. The process of claim 10, in which said solid particulate material in said beds comprises non-catalytic inert material selected from the group consisting of silica, alumina, magnesia and kaolin.

13. The process of claim 10, in which said solid particulate material in said beds comprises a catalytic agent which is a catalyst for the steam reforming reaction, deposited on a suitable carrier.

14. The process of claim 13, in which said catalytic agent is selected from the group consisting of a reduced nickel salt, nickel oxide, metallic nickel, a reduced cobalt compound, metallic cobalt, zirconia, chromia and molybdenum oxide.

15. The process of claim 10, in which said fuel burned in step (k) is a fluid hydrocarbon selected from the group consisting of methane, naphtha, fuel oil and residual oil.

16. The process of claim 10, in which said second bed is vertically above said first bed, said first stream of solid particulate material passed from said second bed to said first bed according to step (e) is transferred downwards by gravity flow, said third bed is vertically above said second bed, said third stream of solid particulate material passed from said third bed to said second bed according to step (1) is transferred downwards by gravity flow, and said second stream of solid particulate material is removed from said first bed according to step (f) by downwards gravity flow transfer prior to step (g).

17. The process of claim 10, in which an elevated fluid pressure above about 35 kg./sq. cm. is maintained in said beds, and said flue gas removed according to step (m) is expanded through mechanical power recovery means before discharge to atmosphere.

18. The process of claim 10, in which the combined gas stream produced by step (i) and comprising a crude synthesis gas stream is processed by successive steps comprising cooling by heat exchange, catalytic reaction of carbon monoxide with steam to form further hydrogen and carbon dioxide, and removal of carbon dioxide, to produce a hydrogen-nitrogen gas mixture for ammonia synthesis.

References Cited

UNITED STATES PATENTS

| | | | |
|---|---|---|---|
| 2,071,721 | 2/1937 | Bagley et al. | 23—212B |
| 2,166,611 | 7/1939 | Shapleigh | 252—376 |
| 2,393,636 | 1/1946 | Johnson | 252—373UX |
| 2,546,606 | 3/1951 | Mayland | 252—373 |
| 2,671,719 | 3/1954 | Lewis et al. | 48—196 |
| 2,671,720 | 3/1954 | Lewis et al. | 48—196 |
| 2,783,133 | 2/1957 | Eastwood | 23—212B |
| 2,789,094 | 4/1957 | Eastman et al. | 252—374X |
| 2,865,864 | 12/1958 | Eastman et al. | 252—374 |
| 3,088,919 | 5/1963 | Brown et al. | 252—374 |
| 3,168,386 | 2/1965 | Moritz et al. | 48—212 |
| 3,418,082 | 12/1968 | Haar | 252—376X |

HOWARD T. MARS, Primary Examiner

U.S. Cl. X.R.

23—288; 48—196, 197, 214; 252—373